United States Patent
Nichols et al.

(10) Patent No.: US 8,125,723 B1
(45) Date of Patent: Feb. 28, 2012

(54) PREDICTIVE CHARACTERIZATION OF ADJACENT TRACK ERASURE IN RECORDING MEDIA

(75) Inventors: Mark A. Nichols, San Jose, CA (US); Harold H. Gee, San Jose, CA (US); Eric Roddick, San Jose, CA (US); Mrugesh Desai, San Jose, CA (US)

(73) Assignee: WD Media, Inc., San Jose, CA (US)

( * ) Notice: Subject to any disclaimer, the term of this patent is extended or adjusted under 35 U.S.C. 154(b) by 41 days.

(21) Appl. No.: 12/718,927

(22) Filed: Mar. 5, 2010

(51) Int. Cl.
G11B 27/36 (2006.01)
G11B 5/03 (2006.01)

(52) U.S. Cl. ............................. 360/31; 360/66
(58) Field of Classification Search .................. None
See application file for complete search history.

(56) References Cited

U.S. PATENT DOCUMENTS

| | | | |
|---|---|---|---|
| 5,600,500 A | 2/1997 | Madsen et al. | |
| 5,691,857 A | 11/1997 | Fitzpatrick et al. | |
| 6,877,116 B1 | 4/2005 | Kost et al. | |
| 6,975,475 B2 | 12/2005 | Lee et al. | |
| 7,095,576 B2 | 8/2006 | Kim et al. | |
| 7,170,700 B1 | 1/2007 | Lin et al. | |
| 7,227,708 B2 | 6/2007 | Feng | |
| 7,567,397 B2 | 7/2009 | Lu | |
| 7,706,096 B2 | 4/2010 | Ito et al. | |
| 7,747,907 B2 | 6/2010 | Olds et al. | |
| 2003/0081338 A1* | 5/2003 | Wang et al. | 360/66 |
| 2011/0075286 A1* | 3/2011 | Duan et al. | 360/31 |

OTHER PUBLICATIONS

Alexander Taratorin, "Characterization of Magnetic Recording Systems: A practical Approach", Guzik Technical Enterprises, ch. 4, 1996.
A. Van Herk, "Side Fringing Fields and Write and Read Crosstalk of Narrow Magnetic Recording Heads", IEEE Transactions on Magnetics, vol. Mag-13, No. 4, pp. 1021-1028, Jul. 1977.
A. Van Herk, et al., "Measurement of Side-Write, -Erase, and -Read Behavior of Conventional Narrow Track Disk Heads", IEEE Transactions on Magnetics, vol. Mag-16, No. 1, pp. 114-119, Jan. 1980.

* cited by examiner

Primary Examiner — Wayne Young
Assistant Examiner — Regina N Holder (57) ABSTRACT

Cross-track density capability is predicted for a large number of writes based on a plurality of erase band width measurements. Over the plurality of erase band width measurements, a number of writes in a series of writes performed as part of an aggressing track sequence is varied. A model of the magnetic track width (MTW) as function of the number of writes employed in the MTW measurements may be generated and an estimate of the erase band width for a large number of writes derived from the model as a prediction of cross-track density capability.

19 Claims, 9 Drawing Sheets

PREDICTIVE CHARACTERIZATION OF ADJACENT TRACK ERASURE IN RECORDING MEDIA

TECHNICAL FIELD

Embodiments of the invention described herein relate to the field of disk drives and more specifically to adjacent track erasure in recording media for disk drives.

BACKGROUND

A disk drive is a data storage device that stores data in concentric tracks on a recording media disk. During operation, the disk is rotated about an axis by a spindle motor while a transducer (head) reads/writes data from/to a target track of the disk. A servo controller uses servo data read from the disk to accurately position the head above the target track while the data transfer takes place. Cross-track density is an important characterization of the storage capability for a given disk drive. Cross-track density (e.g., tracks/inch) is a function of head design as well as the physical qualities of the recording media. Adjacent track erasure, which may limit the cross-track density, occurs when data stored on a first track is corrupted by the writing of data to a second track, adjacent to the first track. Bit error rate (BER) and data loss specifications for a disk drive may therefore limit the cross-track density and overall storage capacity.

Typically, the cross-track density capability of a recording media is measured one of two ways. In the first method, a recorded signal's amplitude change induced by partially erasing a written track with a nearby track write is measured (e.g., a "squash," or "squeeze," measurement). In the second method, an error rate change induced by partially erasing a written track with a nearby track write is measured (e.g., an "off-track read capability (OTRC)," or "747" measurement). A squeeze measurement provides a rapid, but relatively inaccurate, spinstand-based characterization of a recording media. An OTRC measurement provides an accurate, but relatively slow, characterization of a recording media in an assembled disk drive. For example, a single OTRC measurement may take many hours or even days to complete because tens of thousands of read/writes are performed.

BRIEF DESCRIPTION OF THE DRAWINGS

Embodiments of the present invention is illustrated by way of example, and not limitation, in the figures of the accompanying drawings in which.

DETAILED DESCRIPTION

In the following description, numerous specific details are set forth, such as examples of magnetic track width (MTW) measurements, to provide a thorough understanding of various embodiment of the present invention. It will be apparent, however, to one skilled in the art that these specific details need not be employed to practice various embodiments of the present invention. In other instances, well known components or methods have not been described in detail to avoid unnecessarily obscuring various embodiments of the present invention.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, levels, numbers or the like. It should be understood, however, that all of these and similar terms are to be associated with the appropriate physical quantities and are merely convenient labels applied to these quantities.

Unless specifically stated otherwise, as apparent from the following discussions, it is appreciated that throughout the specification discussions utilizing terms such as "performing," "measuring," "generating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices. The methods discussed below may be performed by processing logic (e.g., engines and modules) that may comprise hardware (e.g., circuitry, dedicated logic, programmable logic, microcode, etc.), software (such as instructions run on a processing device), firmware, or a combination thereof, as discussed in further detail below.

Figure 1A:
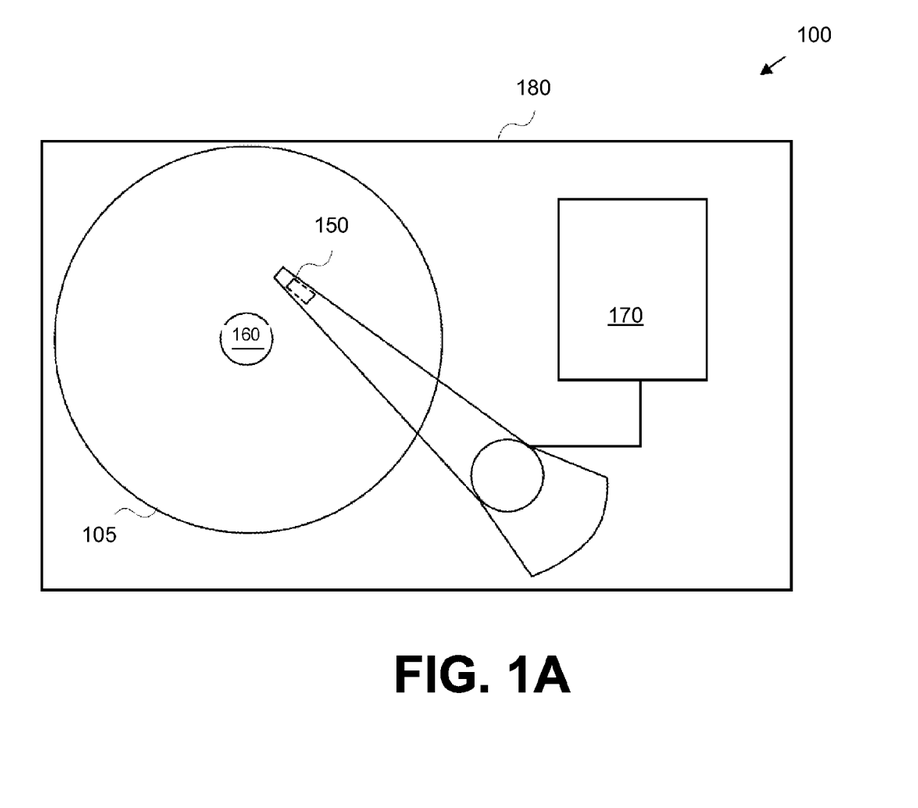
FIG. 1A illustrates a disk drive including a magnetic recording disk, in accordance with an embodiment of the present invention.

FIG. 1A illustrates a disk drive 100 having a disk 105. The disk drive 100 may include one or more disks 105 to store data. The disk 105 resides on a spindle assembly 160 that is mounted to drive housing 180. Data may be stored along tracks in the magnetic recording layer of the disk 105. The reading and writing of data is accomplished with a head 150 that has both read and write elements. The write element is used to alter the properties of magnetic recording layer of disk 105. In one embodiment, the head 150 may have magneto-resistive (MR), or giant magneto-resistive (GMR) elements.

In an alternative embodiment, the head 150 may be another type of head, for example, an inductive read/write head or a Hall effect head. A spindle motor (not shown) rotates a spindle assembly 160 and, thereby, the disk 105 to position head 150 at a particular location along a desired disk track. The position of the head 150 relative to the disk 105 may be controlled by position control circuitry 170.

Figure 1B:
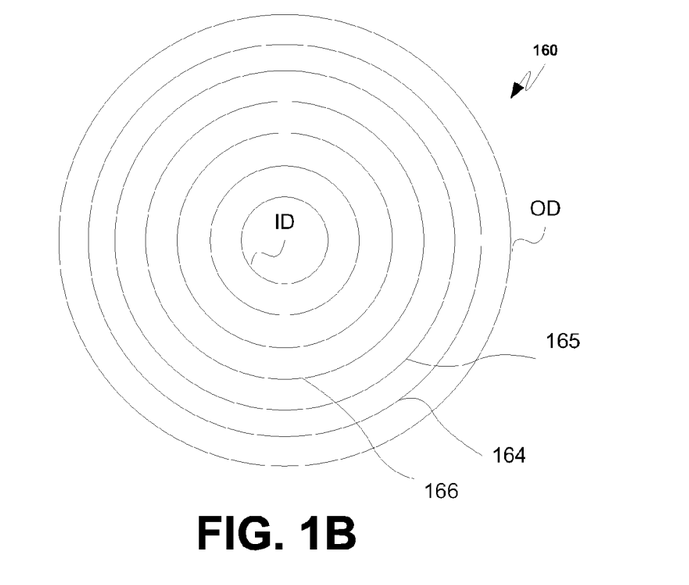
FIG. 1B illustrates a plan view of a recording disk with concentric tracks, in accordance with an embodiment.

FIG. 1B illustrates a plan view of the recording disk 105 with exemplary tracks concentrically arranged between an inner diameter (ID) and an outer diameter (OD) of the disk. As referred to herein, a victim track 165 is disposed adjacent to one or more side tracks 164, 166. In the exemplary embodiment depicted, the victim track 165 is centered between a first side track 164 and a second side track 166. Embodiments herein may involve writing to any of the victim track 165, the first side track 16, and/or the second side track 166. For example, where the victim track 165 is disposed at the ID or OD, methods described herein may involve the victim track 165 and writing to only a single side track 164 or 166. Alternatively, both side tracks 164 and 166 may be written two in succession to arrive at a track width characterization.

Figure 1C:
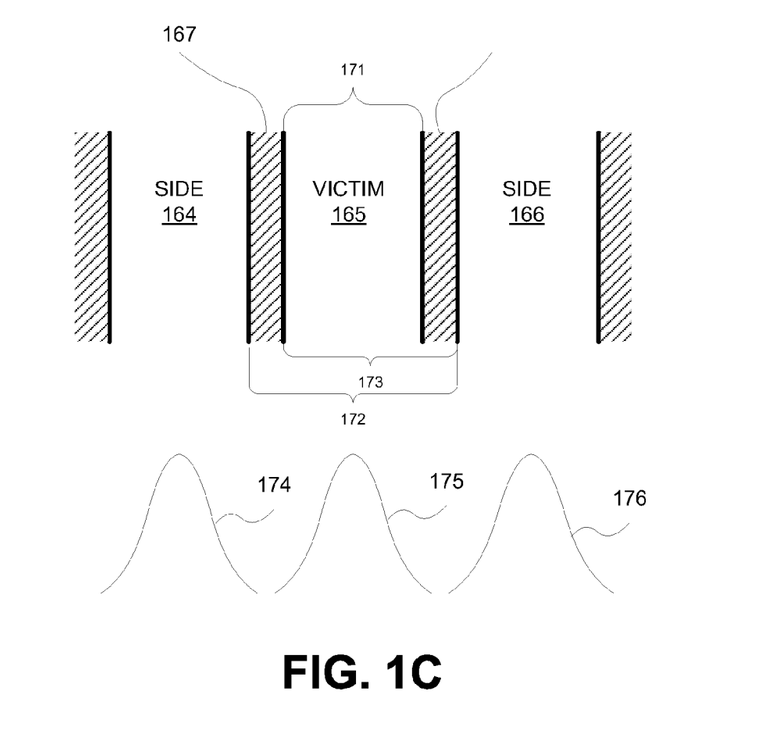
FIG. 1C illustrates an expanded view of three adjacent tracks along with associated track profile curves, in accordance with an embodiment.

FIG. 1C illustrates an expanded view of three adjacent tracks along with associated track profiles, in accordance with an embodiment. As shown, the "visible" cross-track width (along a radius of the disk 105) of the victim track 165 is characterized as the magnetic written width (MWW) 171. The MWW 171 is the recordable portion of the magnetic media associated with the victim track 165 and is confined within the "invisible" erase bands 167. A magnetic track width (MTW) 172 characterizes both the MWW 171 and the cross-track width of the adjacent erase bands 167. From MWW 171 and MTW 172, a magnetic core width (MCW) 173 is determinable as a further metric of a recording media's cross-track density capability. An associated track profile 174-176 for each track 164-166 is further illustrated in FIG. 1C. The track profiles 174-176 represent a relative visible magnetic field strength as a function of cross-track position along a radius of the recording disk 105. With sufficiently low cross-track density, the head 150 is able to discern the victim track profile 175 from the adjacent side track profiles 174 and 176. However, as either or both of the side tracks 164 and 166 are displaced in the cross-track direction toward the victim track 165, the victim track profile 175 is degraded as it is squeezed.

Figure 2:
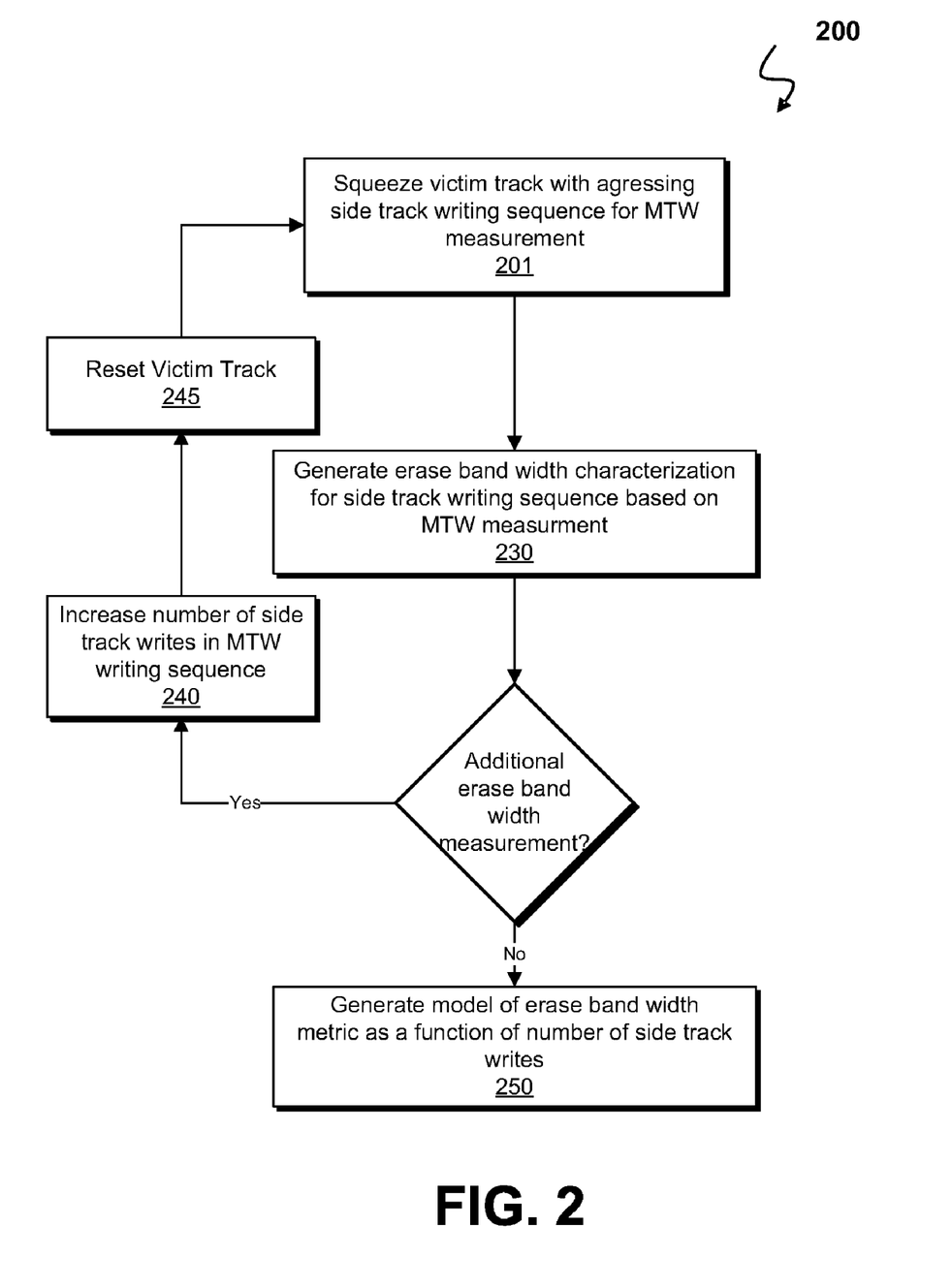
FIG. 2 illustrates a method for generating a model a recording media's density capability as a function of a number of writes, in accordance with an embodiment of the present invention.

FIG. 2 illustrates a method 200 for generating a model a recording media's density capability as a function of a number of writes, in accordance with an embodiment of the present invention. Generally, the method 200 performs a plurality of erase band width measurements with each measurement performed using a track writing sequence that includes a progressively larger number of side track writes so that a model of the erase band width metric as a function of the number of side track writes may be generated. As illustrated, at operation 201 the victim track 165 is squeezed with an aggressing side track writing sequence at operation 201. From the aggressing side track writing sequence, an erase band width metric 172 is determined for the victim track 165. The erase band width metric may be any known in the art and in an exemplary embodiment, the erase band width is determined based an MTW measurement.

If an additional erase band width measurement is to be performed, the method 200 performs the additional measurement with a different number of side track writes performed for each writing operation in the aggressing track writing sequence. For example, at operation 240 the number of writes performed for each side track write in the aggressing track writing sequence is incremented at operation 240. In the exemplary embodiment, the increment is a next number of a logarithmic progression from the previous measurement performed. At operation 245, the victim track is reset to a known state and the method 200 returns to operation 201 to squeeze the victim track using the incremented number of side track writes.

If all desired erase band width measurements have been performed, at operation 250, a model of the erase band width metric as a function of the number of side track writes utilized in each corresponding measurement is generated. Once generated, the function of write number may be utilized as a characterization of the cross-track density which is more accurate than a conventional erase band width measurement based on only a single side track write. The method 200 provides a means of identifying a change in the erase band width as the number of side track writes changes. Because the squeeze algorithms utilized for exemplary MTW measurements provide for a sensitive measurement of both the visible track (e.g., victim track 165) and invisible erase bands (e.g., erase bands 167), this sensitivity may be leveraged to deduce an the erase band width change accurately enough to predict an erase band width for a very large number of writes and thereby shorten the time to characterize a disk's cross-track density capability.

Figure 3:
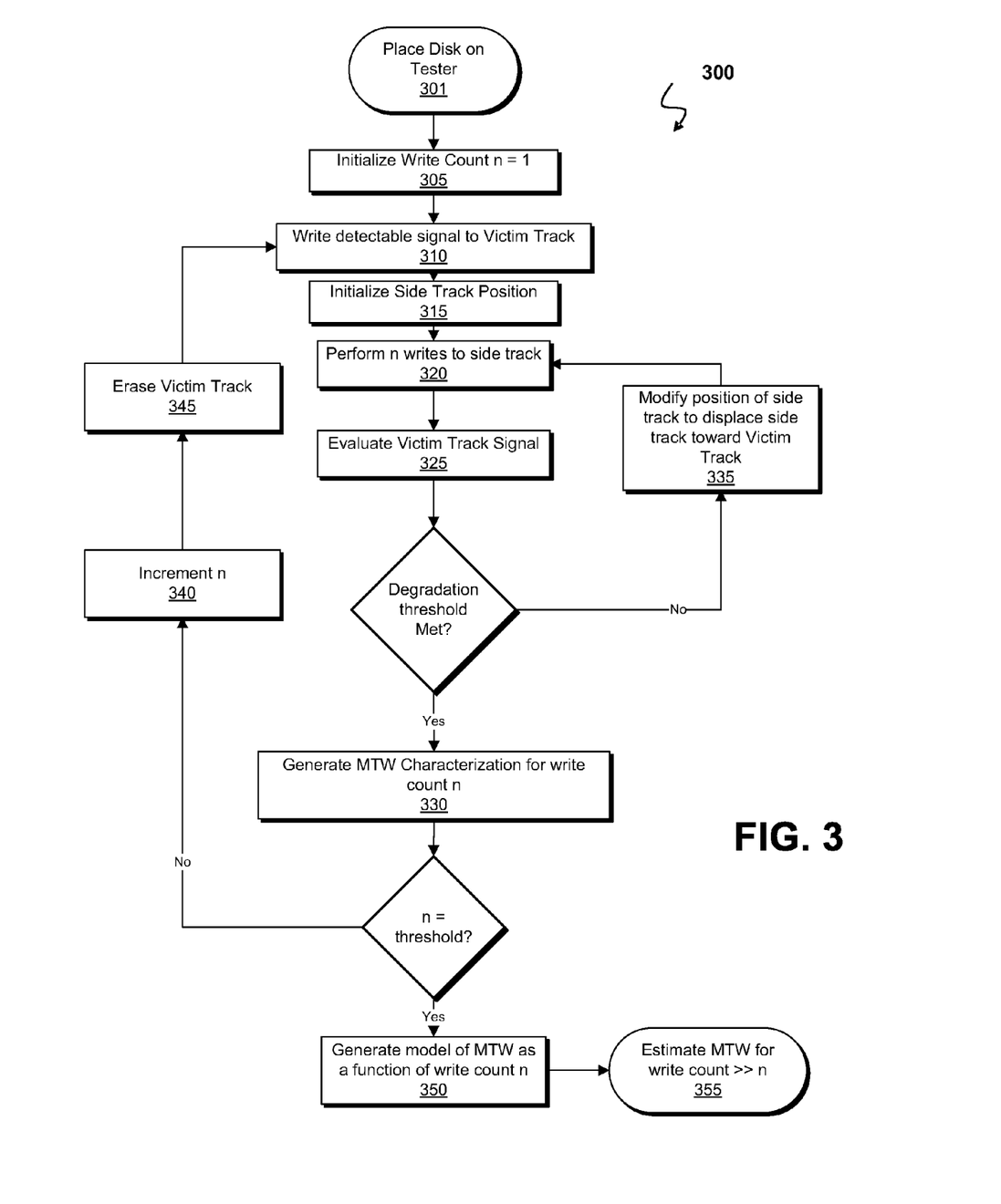
FIG. 3 illustrates a method for predicting a recording media's density capability for a large number of writes, in accordance with an embodiment of the present invention.

FIG. 3 illustrates a method 300 for predicting a recording media's cross-track density capability for a large number of writes based on a plurality of MTW measurements, in accordance with an embodiment of the present invention. As such, the method 300 exemplifies one particular implementation of the more general method 200. Beginning at operation 301, the recording disk 105 is disposed onto a tester. In the exemplary embodiment, the tester is an automated tester including spin-stand. In alternative embodiments however, the method 300 is adapted to a self-test performed on a disk disposed in an assembled drive.

At operation 305, a write count n is initialized to a first value (e.g., n=1) and at operation 310 a signal is written along at least one sector of the victim track 165. In this illustrative embodiment, the victim track 165 is designated as a signal detection track and one or more of the side track 164, 166 are the write tracks. In a further embodiment, the recording frequency of the detectable signal is relatively low, for example at a clock divided by two (2T) data rate. The detectable signal may be written and assessed one or more times to establish a baseline. A baseline assessment of the detectable signal is stored as a reference to monitor the integrity of the detectable signal on the victim track 165 to arrive at an MTW characterization corresponding to n number of writes.

Figure 4A:
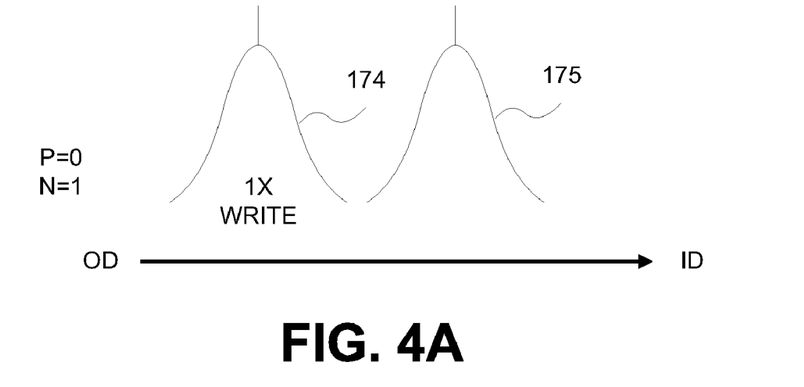
FIGS. 4A-4F illustrate track profiles for a plurality of MTW measurements performed in a method for predicting a recording media's density capability for a large number of writes, in accordance with an embodiment of the present invention.

At operation 315, a side track position P relative to the victim track 165 is initialized and, at operation 320, n side track writes are performed. In embodiments, the write pattern for the side track (164 and/or 166) may correspond to a worst case erase for the victim track 165 (e.g., at a data rate greater than 2T) and where writes to both side tracks 164 and 166 are performed successively at operation 320, the write pattern for each side track may be the same or different. For the exemplary embodiment where n is initialized as n=1, a single write is performed at the initial side track position P=0. FIG. 4A illustrates a track profile resulting after operation 320 where the victim track profile 175 is well-separated in a cross-track direction, from the side track profile 174.

At operation 325, the integrity of the detectable signal on the victim track 165 is reassessed and compared to the baseline detectable signal. Any known algorithm for assessing the degradation of the detectable signal may be employed. In one embodiment, degradation of the detectable signal is assessed at operation 325 based on a signal amplitude reduction. One or more mathematical operations may be performed on the initial and subsequent detectable signals. One or more curve fits of the track profiles 174 and 175 may also be performed and evaluated to assess the detectable signal's degradation. The determined signal degradation is associated with the write count n and position P and stored to a memory. If the degradation is not greater than a predetermined threshold, then at operation 335 the position P is modified to displace the side track 164/166 in an across-track direction toward the victim track 165. The method 300 then returns to operation 320 to again perform n writes to the side track 164/166, at the new position. The victim track signal is again assessed at operation 325 and a signal degradation corresponding to n=1 and P=1 determined and stored to a memory.

Figure 4B:
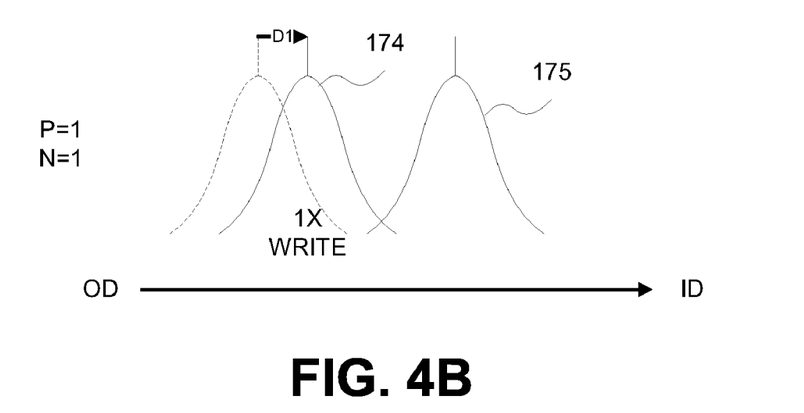
Figure 4C:
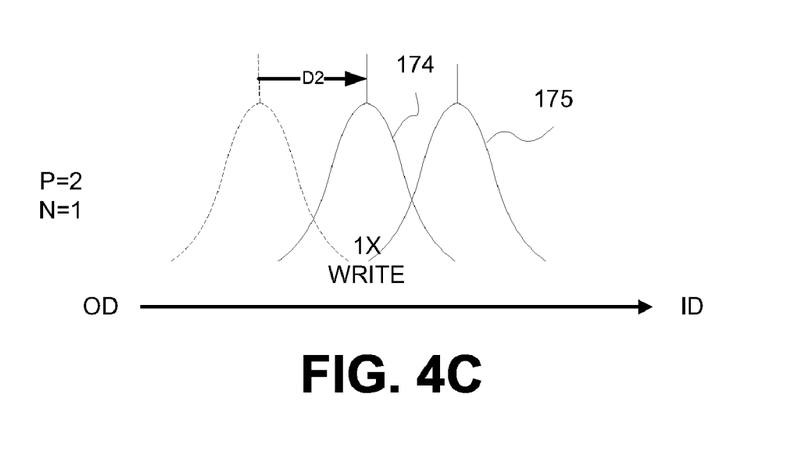

FIG. 4B illustrates track profiles resulting after operation 320 where the victim track profile 175 is squeezed by the side track profile 174 displaced by D1 to the position P=1 from the dashed line representing the initial position P=0. As further depicted in FIG. 4C, a subsequent incremental displacement of the side track profile 174 (D2, as measured from the initial position P=0) induces further measurable degradation of the victim track signal (e.g., corresponding to profile 174). Depending on the embodiment, displacement may be constant with each side track write in the aggressing write sequence (i.e., D1=D2), or it may be made to vary (e.g., D2<D1) as the detectable signal degrades. For example, a subsequent displacement may be determined as a function of the signal degradation associated with a previous displacement. While, the iterative performance of operations 320, 325 and 335 generating the profiles depicted in FIGS. 4A-4C exemplifies an aggressing side track writing sequence, it should be appreciated that various aggressing side track writing sequences known in the art may be adapted to implement the present invention.

Upon reaching a signal degradation threshold (e.g., amplitude of detectable signal is 50% of baseline level) for a given aggressing track writing sequence, an MTW characterization for the disk corresponding to the write count n is generated at operation 330. If write count n is not yet at a threshold value, one or more additional MTW measurements are to be performed and the method 300 proceeds to increment the write count n to a new value at operation 340. Generally, write count n may be set to any value different than a previous write count value so that MTW may be determined for a new number of side track writes. In one embodiment, the write count n is incremented to a successive value in a logarithmic progression. For example, the write count n may be incremented by decades (log base 10) or another base (e.g., log base 2, etc.). In one such embodiment, a write count n=1 is incremented to n=10 at operation 340. In a further embodiment, the write count values are spaced apart such that a model with good fit over a reasonable range of write count may be generated. For example, where three MTW measurements are to be performed, write count n is set to each of 1, 10 and 100.

Figure 4D:
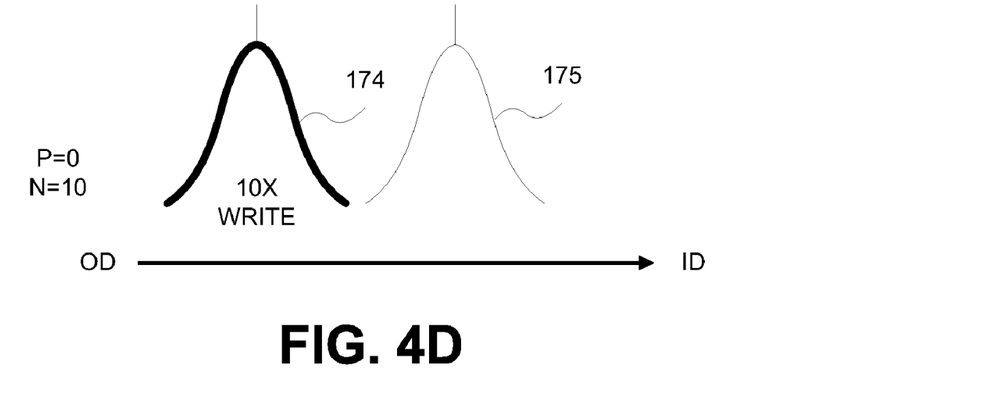

At operation 345, the victim track is erased to allow a new baseline detectable signal to be established at operation 310. The method 300 then proceeds to perform another aggressing track writing sequence with the new write count value. For example, FIG. 4D illustrates a track profile resulting after operation 320 is repeated with a write count of 10. The side track profile 174 is again positioned at P=0 as the initial position for an aggressing track writing sequence, however the side track profile 174 is the result of the ten side track writes performed (i.e., n=10). If the signal degradation is not greater than a predetermined threshold, the aggressing track writing sequence is performed with write count n remaining equal to 10 for each successive iteration of the aggressing track writing sequence ("10× write"). For example, at operation 335 the position P is modified to displace the side track(s) 164(166) in an across-track direction toward the victim track 165 and 10 writes to the side track(s) 164(166) are performed at the new position. The victim track signal is again assessed at operation 325 and a signal degradation corresponding to n=1 and P=1 determined.

Figure 4E:
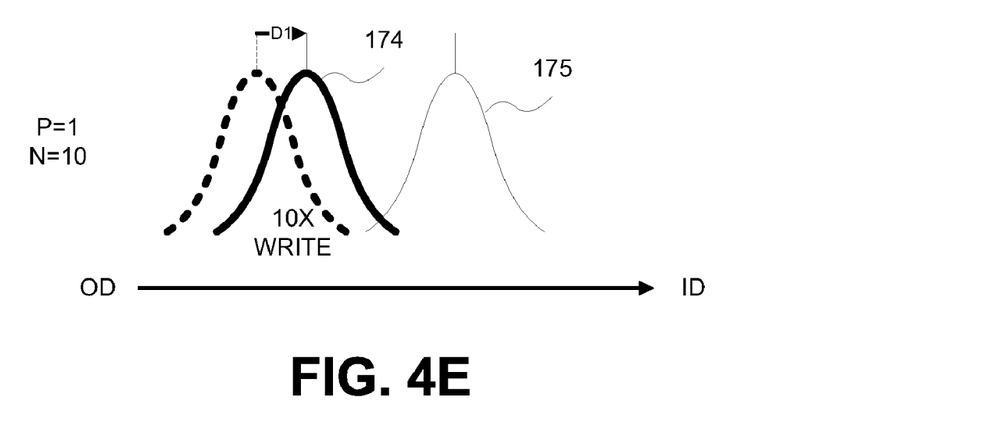
Figure 4F:
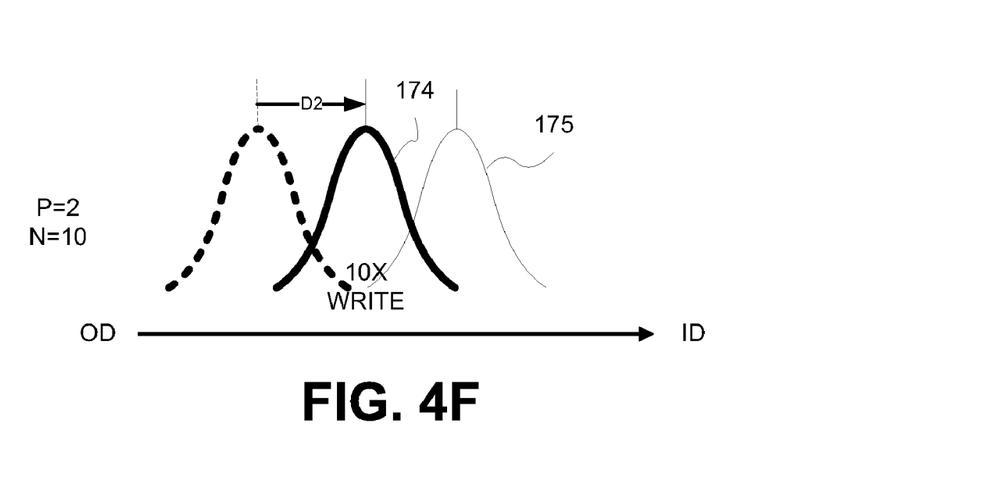

FIG. 4E illustrates track profiles resulting after operation 320 where the victim track profile 175 is squeezed by the side track profile 174 displaced by D1 to the position P=1 for the write count n=10 ("10× write" in FIG. 3E). As further depicted in FIG. 4F, a subsequent incremental displacement of the side track profile 174 (D2, as measured from the initial position P=0) induces further measurable degradation of the victim track signal (e.g., corresponding to profile 174) for the write count n=10. MTW increases as a function of the greater signal degradation resulting from the multiplicity of side track writes. As such, in one embodiment, the side track displacement for the aggressing track writing sequences varies as a function of the write count n. For example, referring to FIGS. 4B and 4D, the displacement D1 may be defined to be smaller for larger write count n.

Figure 5:
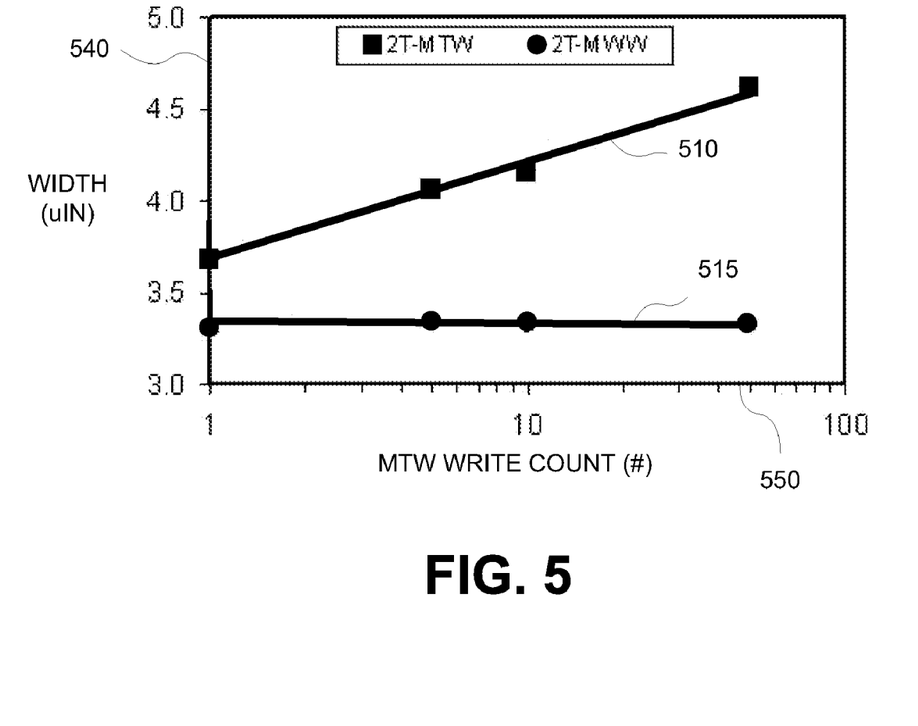
FIG. 5 illustrates a plot of track widths for a plurality of MTW measurements as function of a number of side track writes, in accordance with an embodiment of the present invention.

At operation 350, a model of MTW as a function of write count n is determined based on the plurality of MTW measurements. FIG. 5 illustrates a plot of widths for a plurality of MTW measurements as function of a number of side track writes, in accordance with an embodiment of the present invention. As shown in FIG. 5, both MTW and MWW for a half clock data rate (2T) are plotted against the log of the write count. The MWW measurements need not originate from the plurality of MTW measurements and such MWW measurements may be performed by any technique known in the art. In a particular embodiment, MWW measurements are full width half amplitude (FWHM) track profile measurements performed separately from the plurality of MTW measurements.

Notably, as illustrated by the MWW model function 515, the visible written track width (MWW 171) does not change with a change in write count, but MTW (which includes the invisible erase bands 167) increases as write count increases. As such, a change in an erase band width of the media may be characterized by a model of MTW as a function of the number of side track writes. In the exemplary embodiment, MTW is modeled as a linear function 510 in the log-linear space plotted in FIG. 5. Because of this dependence on the log of write count, incrementing the write count in along a logarithmic progression at operation 340 (FIG. 3) advantageously spaces out the MTW measurement points to provide a model with sufficient accuracy for estimation of the MTW corresponding to a higher write count.

Returning to FIG. 3, at operation 350, the model equation derived from the plurality of MTW measurements is evaluated an arbitrary threshold number of side track writes to estimate a corresponding MTW. As MWW is not dependent on write count, the MTW estimate provides an estimate of the erase band width. In one embodiment, MTW is estimated for a number of writes greater than the largest number of writes performed for the plurality of MTW measurements. In a further embodiment, MTW is estimated for a number of writes greater than the aggregate number of writes performed for the plurality of MTW measurements. The minimum aggregate number of writes for a given set of MTW measurements is equal to (write count, n)(2 side tracks)(2 write positions, P). While the aggregate number of writes is dependent on the victim track signal degradation threshold, the average number of positions, P is typically about 5-7. For the embodiment depicted in FIG. 5 where write count is 1, 5, 10 and 50, the model function 510 is generated from four aggressing track sequences having an aggregate write count on the order of 1000 ((1)(2)(5)+(5)(2)(5)+10(2)(5)+(50)(2)(5)). From this model, MTW and/or erase band width may then be estimated for 5000, 10,000, 100,000, etc. track writes.

The methods described herein provide a prediction of MTW and the erase band width responsible for erasing adjacent tracks based on a characterization of the change in the invisible erase band width with additional writes. Because the methods provide a means to extrapolate to a large number of writes, one can avoid much more time and equipment intensive measurements. Indeed, the methods described herein may take an order of magnitude less time than alternative methods known in the art and yet capture changes not detectable with a single-write test. In certain embodiments, the methods described herein are adapted to provide a means for media disk manufacturing process development and/or quality control to improve or sustain a disk's cross-track density capability. For example, every media disk manufactured may be characterized by the method 300 to ensure the cross-track density capability of the media is sufficient.

Embodiments of the present invention include apparatuses for performing the algorithms described herein. The algorithms of the present invention may be implemented on a stand-alone or networked computer system based on a number of instructions that are executed by the computer(s) to estimate a cross-track density capability of a recording media. The algorithms of the present invention may alternatively be hardcoded into microcode, using FPGAs, for example.

Figure 6:
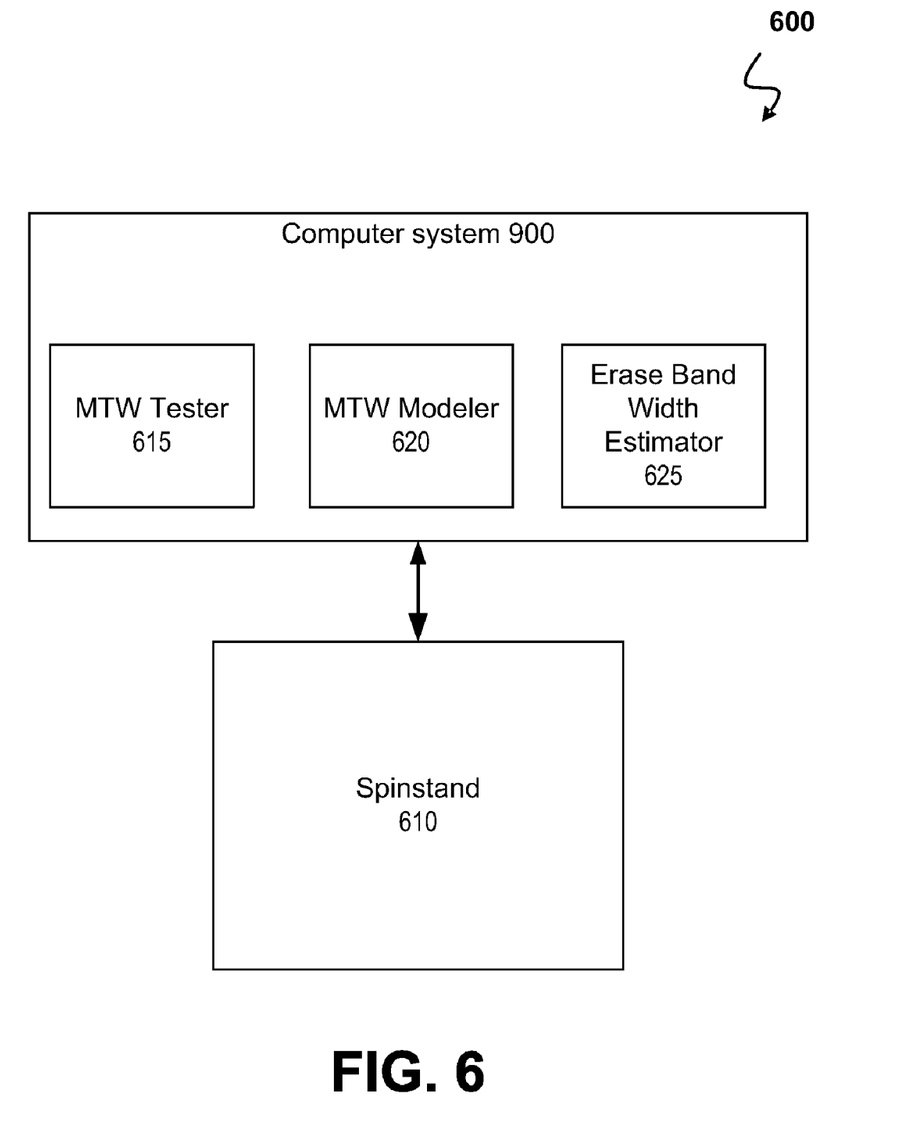
FIG. 6 illustrates a block diagram of an automated tester for determining a cross-track density capability of a recording media, in accordance with an embodiment of the invention.

An apparatus may be specially constructed for the desired purposes, such as a spinstand computerized controller included in an automated tester. FIG. 6 illustrates a block diagram of an automated tester 600 for determining a cross-track density capability of a recording media, in accordance with an embodiment of the invention. As depicted, the automated tester 600 includes a spinstand 610, such as one commercially available from Guzik Technical Enterprises of Mountain View, Calif. The spinstand 610 is communicatively coupled to a computer system 900 and configured to be controlled by the computer system 900. The computer system 900 is generally further configured to perform any of the algorithms or method described herein.

In the exemplary embodiment depicted, the computer system 900 includes an MTW tester 615, which may be implemented in either software, hardware, or a combination of both to perform the plurality of MTW measurements on a disk disposed on the spinstand 610. In a particular embodiment, the MTW tester 615 is to perform an aggressing side track writing sequence to squeeze a victim track for each of the plurality of MTW measurements. In further embodiments, each side track writing of the aggressing sequence includes a series of multiple writes to the side track, and the number of the multiple writes varies across the plurality of MTW measurements. As further depicted, the computer system 900 includes an MTW modeler 620, which may be implemented in either software, hardware, or a combination of both to generate a model of MTW as a function of the side track writes based on the plurality of MTW measurements performed by the MTW tester 615. The computer system 900 further includes an erase band width estimator 625, which may be implemented in either software, hardware, or a combination of both to estimate an erase band width of a disk corresponding to a number of writes based on the model generated by the MTW modeler 620.

The components 615, 620 and 625 described herein can be implemented as discrete hardware components or integrated in the functionality of hardware components such as ASICS, FPGAs, DSPs or similar devices. In addition, the components 615, 620 and 625 can also be implemented as firmware, or functional circuitry within hardware devices, and software. Further, the components 615, 620 and 625 can be implemented in any combination hardware and software components of computer system 900.

The computer system 900 may further include a general purpose computing device which may be selectively activated or reconfigured by a program stored in the device. Such a program may be stored on a storage medium, such as, but not limited to, any type of disk including floppy disks, optical disks, compact disc read only memories (CD-ROMs), magnetic-optical disks, read-only memories (ROMs), random access memories (RAMs), electrically programmable read-only memories (EPROMs), electrically erasable and programmable read only memories (EEPROMs), magnetic or optical cards, or any other type of media suitable for storing electronic instructions, and capable of being coupled to a system bus for a computing device.

The present invention may be provided as a computer program product, or software, that may include a machine-readable medium having stored thereon instructions, which may be used to program a computer system (or other electronic devices) to perform an algorithm according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical or other form of propagated signals (e.g., carrier waves, infrared signals, digital signals, etc.)), etc.

Figure 7:
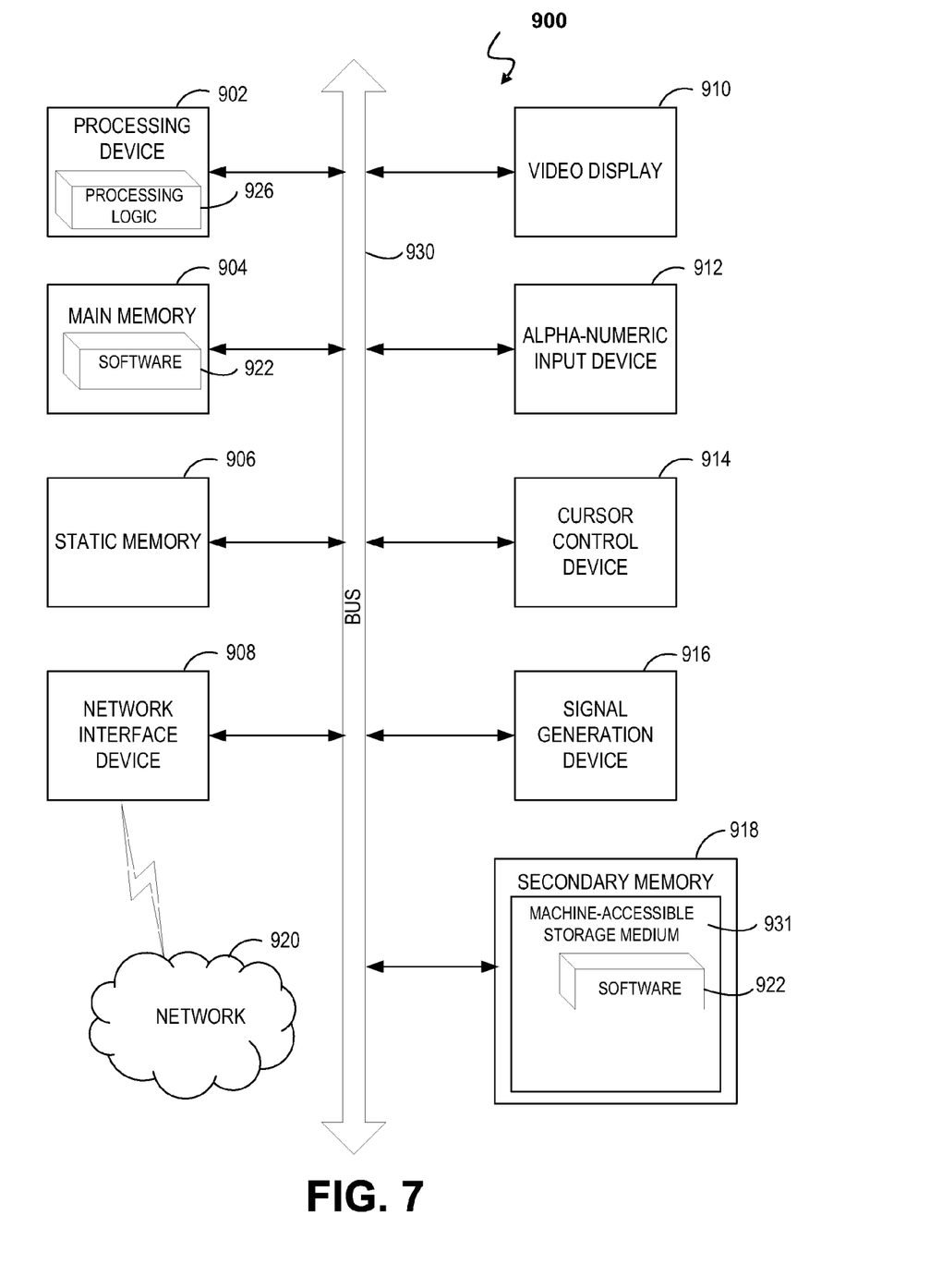
FIG. 7 illustrates a block diagram of an exemplary computer system used to practice embodiments of the present invention.

FIG. 7 illustrates a diagrammatic representation of a machine in the exemplary form of the computer system 900 within which a set of instructions, for causing the machine to perform any one or more of the MTW measurement and modeling methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 900 includes a processing device 902, a main memory 904 (e.g., read-only memory (ROM), flash memory, dynamic random access memory (DRAM) such as synchronous DRAM (SDRAM) or Rambus DRAM (RDRAM), etc.), a static memory 906 (e.g., flash memory, static random access memory (SRAM), etc.), and a secondary memory 918 (e.g., a data storage device), which communicate with each other via a bus 930.

Processing device 902 represents one or more general-purpose processing devices such as a microprocessor, central processing unit, or the like. More particularly, the processing device 902 may include a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 902 may also be one or more special-purpose processing devices such as an application specific integrated circuit (ASIC), a field programmable gate array (FPGA), a digital signal processor (DSP), network processor, or the like. Processing device 902 is configured to execute the processing logic 926 for performing the operations and steps discussed herein.

The computer system 900 may further include a network interface device 908. The computer system 900 also may include a video display unit 910 (e.g., a liquid crystal display (LCD) or a cathode ray tube (CRT)), an alphanumeric input device 912 (e.g., a keyboard), a cursor control device 914 (e.g., a mouse), and a signal generation device 916 (e.g., a speaker).

The secondary memory 918 may include a machine-accessible storage medium (or more specifically a computer-readable storage medium) 931 on which is stored one or more sets of instructions (e.g., software 922) embodying any one or more of the methodologies or functions described herein. The software 922 may also reside, completely or at least partially, within the main memory 904 and/or within the processing device 902 during execution thereof by the computer system 900, the main memory 904 and the processing device 902 also constituting machine-readable storage media. The software 922 may further be transmitted or received over a network 920 via the network interface device 908.

The machine-accessible storage medium 931 may store sets of instructions (e.g., software 922) embodying any one or more of the methodologies or functions described herein. While the machine-accessible storage medium 931 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present invention. The term "machine-readable storage medium" shall accordingly be taken to include, but not be limited to, solid-state memories, and optical and magnetic media.

In the foregoing specification, embodiments of the invention have been described with reference to specific exemplary features thereof. It will, however, be evident that various modifications and changes may be made thereto without departing from the broader spirit and scope of the invention as set forth in the appended claims. The specification and figures are, accordingly, to be regarded in an illustrative rather than a restrictive sense.

What is claimed is:

1. A method for determining a cross-track density capability of a recording media, the method comprising:
   squeezing a victim track with a first aggressing side track writing sequence until a signal stored on the victim track reaches a threshold level of degradation, the first aggressing side track writing sequence comprising:
      iteratively displacing the side track in an across-track direction toward the victim track and performing a side track write n times with each iteration;
   determining a first erase band width associated with the first aggressing side track writing sequence;
   squeezing a victim track with a second aggressing side track writing sequence until a signal stored on the victim track reaches a threshold level of degradation, the second aggressing side track writing sequence comprising:
      iteratively displacing the side track in an across-track direction toward the victim track and performing a side track write m times with each iteration, wherein m is different than n;
   determining a second erase band width associated with the second aggressing side track writing sequence; and
   generating, from the first and second erase band width, a model characterizing the erase band width of the media as a function of the number of side track writes in an aggressing side track writing sequence.

2. The method of claim 1, further comprising generating from the model an estimate of the erase band width corresponding to a threshold number of side track writes greater than a sum of n and m.

3. The method of claim 2, wherein generating the model further comprises:
   determining a change of magnetic track width (MTW) as a function of the number of side track writes; and
   wherein generating the estimate of the erase band width further comprises evaluating the MTW function at the threshold number of side track writes.

4. The method of claim 3, wherein the change of MTW is modeled as a logarithmic function of the number of side track writes.

5. The method of claim 3, wherein the n and m are both less than 100 and threshold number of side track writes is at least 5000.

6. The method as in claim 1, wherein squeezing the victim track with the first and second aggressing side track writing sequences further comprises:
   evaluating the detectable signal each time the number of side track writes are performed.

7. The method of claim 1, further comprising squeezing a victim track with a third aggressing side track writing sequence by performing a side track write p times with each iteration, wherein p is different than m and n.

8. The method of claim 7, wherein the numbers of side track writes in the series n, m, and p is incremented in a logarithmic progression.

9. The method of claim 1, further comprising erasing the victim track between the first and second aggressing side track writing sequences.

10. A computer-accessible non-transitory storage medium with instructions stored thereon, which when executed by a computer system, cause the computer system to perform the method of claim 1.

11. An automated tester for determining a cross-track density capability of a recording media, the automated tester comprising:
   means for squeezing a victim track with a first aggressing side track writing sequence until a signal stored on the victim track reaches a threshold level of degradation, the first aggressing side track writing sequence comprising:
      iteratively displacing the side track in an across-track direction toward the victim track and performing a side track write n times with each iteration;
   means for determining a first erase band width associated with the first aggressing side track writing sequence;
   means for squeezing a victim track with a second aggressing side track writing sequence until a signal stored on the victim track reaches a threshold level of degradation, the second aggressing side track writing sequence comprising:

iteratively displacing the side track in an across-track direction toward the victim track and performing a side track write m times with each iteration, wherein m is different than n;

means for determining a second erase band width associated with the second aggressing side track writing sequence; and means for generating, from the first and second erase band width, a model characterizing the erase band width of the media as a function of the number of side track writes in an aggressing side track writing sequence.

12. The automated tester of claim 11, further comprising:

means for generating from the model an estimate of the erase band width corresponding to a threshold number of side track writes greater than the sum of n and m.

13. The automated tester of claim 12, wherein the model generating means further comprises:

means for determining a change of magnetic track width (MTW) as a function of the number of side track writes; and wherein the estimating means further comprises a means for evaluating the MTW function at the threshold number of side track writes.

14. The automated tester of claim 13, wherein the means for squeezing the victim track with the first and second aggressing side track writing sequences further comprises:

means for evaluating the detectable signal each time the number of side track writes are performed.

15. The automated tester of claim 11, further comprising means for erasing the victim track between the first and second aggressing side track writing sequences.

16. An automated tester for determining a cross-track density capability of a recording media, the automated tester comprising:

a spinstand;

an MTW tester to squeeze a victim track with a first aggressing side track writing sequence until a signal stored on the victim track reaches a threshold level of degradation, the first aggressing side track writing sequence comprising:

iteratively displacing the side track in an across-track direction toward the victim track and performing a side track write n times with each iteration;

determine a first erase band width associated with the first aggressing side track writing sequence;

squeeze a victim track with a second aggressing side track writing sequence until a signal stored on the victim track reaches a threshold level of degradation, the second aggressing side track writing sequence comprising:

iteratively displacing the side track in an across-track direction toward the victim track and performing a side track write m times with each iteration, wherein m is different than n; and determine a second erase band width associated with the second aggressing side track writing sequence; and a MTW modeler to generate, from the first and second erase band width, a model characterizing the erase band width of the media as a function of the number of side track writes in an aggressing side track writing sequence.

17. The automated tester of claim 16, further comprising:

an erase band width estimator to generate an estimate of the erase band width corresponding to a threshold number of side track writes.

18. The automated tester of claim 17, wherein the modeler is to:

determine a change of a magnetic track width (MTW) as a function of the number of side track writes; and wherein the erase band width estimator is to evaluate the MTW function at the threshold number of side track writes.

19. The automated tester of claim 16, wherein the MTW tester is configured to erase the victim track between squeezing the victim track with the first and second aggressing side track writing sequences.

* * * * *